US009266065B2

(12) United States Patent
McGinnis et al.

(10) Patent No.: US 9,266,065 B2
(45) Date of Patent: Feb. 23, 2016

(54) OSMOTIC SEPARATION SYSTEMS AND METHODS

(75) Inventors: Robert L. McGinnis, Coventry, CT (US); Joseph Edward Zuback, Camarillo, CA (US)

(73) Assignee: Oasys Water, Inc., Boston, MA (US)

( * ) Notice: Subject to any disclaimer, the term of this patent is extended or adjusted under 35 U.S.C. 154(b) by 763 days.

(21) Appl. No.: 13/504,049

(22) PCT Filed: Oct. 29, 2010

(86) PCT No.: PCT/US2010/054738
§ 371 (c)(1),
(2), (4) Date: Jul. 9, 2012

(87) PCT Pub. No.: WO2011/053794
PCT Pub. Date: May 5, 2011

(65) Prior Publication Data
US 2012/0267306 A1    Oct. 25, 2012

Related U.S. Application Data

(60) Provisional application No. 61/256,757, filed on Oct. 30, 2009.

(51) Int. Cl.
*C02F 1/44* (2006.01)
*B01D 61/00* (2006.01)
(Continued)

(52) U.S. Cl.
CPC ............ *B01D 61/002* (2013.01); *B01D 61/005* (2013.01); *B01D 63/082* (2013.01); *C02F 1/445* (2013.01); *B01D 2315/06* (2013.01);
(Continued)

(58) Field of Classification Search
CPC ........... B01D 2313/38; B01D 2317/02; B01D 61/002; B01D 61/005; B01D 2311/04; C02F 1/445
USPC .............. 210/175, 184, 323.1, 252, 335, 259, 210/257.1
See application file for complete search history.

(56) References Cited

U.S. PATENT DOCUMENTS 3,130,156 A    4/1964  Neff
3,171,799 A    3/1965  Batchelder
(Continued)

FOREIGN PATENT DOCUMENTS

EP    0121099 A2    10/1984
EP    0537614 A1    4/1993
(Continued)

OTHER PUBLICATIONS

"Prevention of Calcium Sulphate Crystallisation in Water Desalination Plants Using Slurry Precipitation and Recycle Reverse Osmosis (SPARRO)". Foundation for Water Research. Report 1372/1/06. Feb. 2006.
(Continued)

*Primary Examiner* — Katherine Zalasky
(74) *Attorney, Agent, or Firm* — Lando & Anastasi, LLP

(57) ABSTRACT

Separation processes using engineered osmosis are disclosed generally involving the extraction of solvent from a first solution to concentrate solute by using a second concentrated solution to draw the solvent from the first solution across a semi-permeable membrane. Enhanced efficiency may result from using low grade waste heat from industrial or commercial sources.

10 Claims, 13 Drawing Sheets

(51) Int. Cl.
*B01D 63/08* (2006.01)
*B01D 3/42* (2006.01)
*B01D 5/00* (2006.01)
*C02F 1/04* (2006.01)
*C02F 1/20* (2006.01)
*C02F 1/28* (2006.01)
*C02F 1/42* (2006.01)
*C02F 1/74* (2006.01)
*C02F 5/02* (2006.01)
*C02F 103/08* (2006.01)

(52) U.S. Cl.
CPC .. *C02F 1/04* (2013.01); *C02F 1/20* (2013.01); *C02F 1/28* (2013.01); *C02F 1/42* (2013.01); *C02F 1/442* (2013.01); *C02F 1/74* (2013.01); *C02F 5/02* (2013.01); *C02F 2103/08* (2013.01); *C02F 2209/06* (2013.01); *C02F 2209/40* (2013.01); *C02F 2303/20* (2013.01); *Y02W 10/37* (2013.01)

(56) References Cited

U.S. PATENT DOCUMENTS

| | | |
|---|---|---|
| 3,216,930 A | 11/1965 | Glew |
| 3,357,917 A | 12/1967 | Humphreys |
| 3,405,058 A | 10/1968 | Miller |
| 3,532,621 A | 10/1970 | Hough |
| 3,541,006 A | 11/1970 | Bixler |
| 3,562,152 A | 2/1971 | Davison |
| 3,617,547 A | 11/1971 | Halff et al. |
| 3,670,897 A | 6/1972 | Frank |
| 3,707,231 A | 12/1972 | Bradley |
| 3,721,621 A | 3/1973 | Hough |
| 4,083,781 A | 4/1978 | Conger |
| 4,141,825 A | 2/1979 | Conger |
| 4,142,966 A | 3/1979 | Perry |
| 4,161,445 A | 7/1979 | Coillet |
| 4,332,685 A | 6/1982 | Nowlin et al. |
| 4,334,992 A | 6/1982 | von Bonin et al. |
| 4,545,862 A | 10/1985 | Gore et al. |
| 4,574,049 A | 3/1986 | Pittner |
| 4,689,156 A | 8/1987 | Zibrida |
| 4,767,544 A | 8/1988 | Hamblin |
| 4,781,837 A | 11/1988 | Lefebvre |
| 4,808,287 A | 2/1989 | Hark |
| 5,098,575 A | 3/1992 | Yaeli |
| 5,266,203 A | 11/1993 | Mukhopadhyay et al. |
| 5,281,430 A | 1/1994 | Herron et al. |
| 5,382,365 A | 1/1995 | Deblay |
| 5,403,490 A | 4/1995 | Desai |
| 5,501,798 A | 3/1996 | Al-Samadi et al. |
| 5,925,255 A | 7/1999 | Mukhopadhyay |
| 6,368,849 B1 | 4/2002 | Norddahl |
| 6,375,848 B1 | 4/2002 | Cote et al. |
| 6,391,205 B1 | 5/2002 | McGinnis |
| 6,537,456 B2 | 3/2003 | Mukhopadhyay |
| 6,716,355 B1 | 4/2004 | Hanemaaijer et al. |
| 6,849,184 B1 | 2/2005 | Lampi et al. |
| 7,025,885 B2 | 4/2006 | Cote et al. |
| 7,320,756 B2 | 1/2008 | Mukhopadhyay |
| 7,455,109 B2 | 11/2008 | Collins |
| 7,560,029 B2 | 7/2009 | Mc Ginnis |
| 7,608,188 B2 | 10/2009 | Cath et al. |
| 7,695,624 B2 | 4/2010 | Brockmann et al. |
| 7,727,400 B2 | 6/2010 | Flynn |
| 7,744,761 B2 | 6/2010 | Constantz et al. |
| 7,879,243 B2 | 2/2011 | Al-Mayahi et al. |
| 7,914,680 B2 | 3/2011 | Cath et al. |
| 8,021,549 B2 | 9/2011 | Kirts |
| 8,029,671 B2 | 10/2011 | Cath et al. |
| 8,070,954 B2 | 12/2011 | Ito et al. |
| 2005/0145568 A1 | 7/2005 | Mc Ginnis |
| 2006/0011544 A1 | 1/2006 | Sharma et al. |
| 2006/0144789 A1 | 7/2006 | Cath et al. |
| 2006/0237366 A1* | 10/2006 | Al-Mayahi .................. 210/644 |
| 2007/0001324 A1* | 1/2007 | Cote et al. .................. 261/122.1 |
| 2007/0068871 A1* | 3/2007 | Flynn ............................ 210/649 |
| 2007/0246426 A1* | 10/2007 | Collins ......................... 210/651 |
| 2007/0278153 A1 | 12/2007 | Oriard et al. |
| 2008/0307968 A1* | 12/2008 | Kang et al. ...................... 95/199 |
| 2010/0108587 A1 | 5/2010 | McGinnis |
| 2010/0155333 A1 | 6/2010 | Husain et al. |
| 2010/0163471 A1 | 7/2010 | Elyanow et al. |
| 2010/0192575 A1 | 8/2010 | Al-Mayahi et al. |
| 2011/0155665 A1 | 6/2011 | Cohen et al. |
| 2011/0155666 A1 | 6/2011 | Prakash et al. |
| 2013/0001162 A1 | 1/2013 | Yangali-Quintanilla et al. |

FOREIGN PATENT DOCUMENTS

| | | |
|---|---|---|
| FR | 2102763 A5 | 4/1972 |
| GB | 1526836 A | 10/1978 |
| GB | 2442941 A | 4/2008 |
| GB | 2464956 A | 5/2010 |
| JP | 53-032885 A | 3/1978 |
| JP | 57-012802 A | 1/1982 |
| JP | 06-063362 A | 3/1994 |
| JP | 2007245064 A | 9/2007 |
| JP | 2008-100219 A | 5/2008 |
| JP | 2011083663 A | 4/2011 |
| KR | 10-0697563 B1 | 3/2007 |
| KR | 2011-0045941 A | 5/2011 |
| WO | 9323150 A1 | 11/1993 |
| WO | 9939799 A1 | 8/1999 |
| WO | 0105707 A1 | 1/2001 |
| WO | 2007146094 A2 | 12/2007 |
| WO | 2008059219 A1 | 5/2008 |
| WO | 2008060435 A2 | 5/2008 |
| WO | 2009155596 A2 | 12/2009 |
| WO | 2011004303 A1 | 1/2011 |
| WO | 2011053794 A2 | 5/2011 |

OTHER PUBLICATIONS

Achilli et al. "Pressure Retarded Osmosis: From the Vision of Sidney Loeb to the First Prototype Installation—Review". Desalination 261 (2010) pp. 205-211.
Achilli et al. "The Forward Osmosis Membrane Bioreactor: A Low Fouling Alternative to MBR Processes". Desalination 239 (2009) 10-21.
Bamaga et al. "Application of Forward Osmosis in Pretreatment of Seawater for Small Reverse Osmosis Desalination Units". Desalination and Water Treatment, vol. 5 (May 2009) 183-191.
Bamaga et al. "Hybrid FO/RO Desalination System: Preliminary Assesment of Osmotic Energy Recovery and Designs of New FO Membrane Module Configurations". Desalination 268 (2011) pp. 163-169.
Cath et al. "A Multi-Barrier Osmotic Dilution Process for Simultaneous Desalination and Purification of Impaired Water". Journal of Membrane Science 362 (2010). pp. 417-426.
Cath et al. "Forward Osmosis: Principles, Applications, and Recent Developments". Journal of Membrane Science 281:70-97 (2006).
Choi et al. "Toward A Combined System of Forward Osmosis and Reverse Osmosis for Seawater Desalination". Desalination 247 (2009) 239-246.
Chung et al. "Forward Osmosis Processes: Yesterday, Today, and Tomorrow". Desalination. 2011.
Gerstandt et al. "Membrane Processes in Energy Supply for an Osmotic Power Plant". Desalination 224 (2008) pp. 64-70.
Ghiu et al. "Permeability of Electrolytes Through a Flat RO Membrane in a Direct Osmosis Study". Desalination 144 (2002) 387-392.
Glueckauf et al. "Sea Water Softening by Osmosis Through Desalinating Membranes". Desalination 3 (1967) 155-168.
Gray et al. "Internal Concentration Polarization in Forward Osmosis: Role of Membrane Orientation". Desalination 197 (2006) pp. 1-8.
Holloway et al. "Forward Osmosis for Concentration of Anaerobic Digester Centrate". Water Research 41 (2007) pp. 4005-4014.
Kessler et al. "Drinking Water from Sea Water by Forward Osmosis". Desalination 18 (1976) 297-306.

(56) References Cited

OTHER PUBLICATIONS

Khalil et al. "A Novel, Safe, and Environmentally Friendly Technology for Water Production through Recovery of Rejected Thermal Energy from Nuclear Power Plants". Proceedings of ICONE14, International Conference on Nuclear Engineering. Miami, Florida. Jul. 17-20, 2005.

Khaydarov et al. "Solar Powered Direct Osmosis Desalination". Desalination 217 (2007) 225-232.

Lay et al. "Study of Integration of Forward Osmosis and Biological Process: Membrane Performance Under Elevated Salt Environment". Desalination Journal. © 2011 Elsevier B.V.

Loeb et al. "Energy Production at the Dead Sea by Pressure-Retarded Osmosis: Challenge or Chimera". Desalination 120 (1998) pp. 247-262.

Loeb et al. "Large Scale Power Production by Pressure-Retarded Osmosis, Using River Water and Sea Water Passing Through Spiral Modules". Desalination 143 (2002) 115-122.

Loeb et al. "One Hundred and Thirty Benign and Renewable Megawatts From Great Salt Lake? The Possibilities of Hydroelectric Power by Pressure-Retarded Osmosis". Desalination 141 (2001) pp. 85-91.

McCutcheon et al. "A Novel Ammonia-Carbon Dioxide Forward (Direct) Osmosis Desalination Process". Desalination 174:1-11. 2005.

McCutcheon et al. "Desalination by Ammonia-Carbon Dioxide Forward Osmosis: Influence of Draw and Feed Solution Concentrations on Process Performance". Journal of Membrane Science 278 (2006) 114-123.

McCutcheon et al. "The Ammonia-Carbon Dioxide Forward Osmosis Desalination Process". Water Conditioning and Purification; Oct. 2006.

McGinnis et al. "Energy Requirements of Ammonia-Carbon Dioxide Forward Osmosis Desalination". Desalination 207: 370-382. 2007.

McGinnis et al. "Forward Osmosis Desalination: Current Research and Future Prospects". For Presentation at the 2007 Conference of American Membrane Technology Association. Jul. 23-27, 2007.

McGinnis et al. "Global Challenges in Energy and Water Supply: The Promise of Engineered Osmosis". Environ. Sci. Technol. 2008, 42, 8625-8629 (Online Dec. 1, 2008).

Mehta et al. "Internal Polarization in the Porous Substructure of a Semipermeable Membrane Under Pressure-Retarded Osmosis". Journal of Membrane Science 4 (1978) pp. 261-265.

Moody et al. "Forward Osmosis Extractors". Desalination 18 (1976) 283-295.

Osman et al. "Desalination/Concentration of Reverse Osmosis and Electrodialysis Brines with Membrane Distillation". Desalination and Water Treatment 24:293-301 (2010).

Panyor et al. "Renewable Energy from Dilution of Salt Water with Fresh Water: Pressure Retarded Osmosis". Desalination 199 (2006) pp. 408-410.

Phuntsho et al. "A Novel Low Energy Fertilizer Driven Forward Osmosis Desalination for Direct Fertigation: Evaluating the Performance of Fertilizer Draw Solutions". Journal of Membrane Science 375 (2011) 172-181.

Skilhagen et al. "Osmotic Power—Power Production Based on the Osmotic Pressure Difference Between Waters With Varying Salt Gradients". Desalination 220 (2008) pp. 476-482.

Tang et al. "Concentration of Brine by Forward Osmosis: Performance and Influence of Membrane Structure". Desalination 224 (2008) pp. 143-153.

Wallace et al. "A Thermodynamic Benchmark for Assessing an Emergency Drinking Water Device based on Forward Osmosis". Desalination 227 (2008) 34-45.

Williams et al. "Non-Therman Process for Recovering Reverse Osmosis Concentrate: Process Chemistry and Kinetics". Presented at the 2002 Water Quality Technology Conference, American Water Works Association, Nov. 10-14, 2002. Seattle, Washington.

Lokiec et al. "The Mechanical Vapor Compression: 38 Years of Experience". IDS World Congress—Maspalonmas, Gran Canaria Spain Oct. 21-26, 2007.

Martinetti et al. "High Recovery of Concentrated RO Brines Using Forward Osmosis and Membrane Distillation". Journal of Membrane Science 331 (2009) pp. 31-39.

* cited by examiner

Vertical Three-Bladder Configuration     Horizontal Three-Bladder Configuration

Horizontal Two-Bladder Configuration

WATER
BLEND
CONCENTRATE

Design to maintain uniform draw solution velocity as draw solution volume increases from entrance to exit Vapour Compression Zero Liquid Discharge Crystallizer

OSMOTIC SEPARATION SYSTEMS AND METHODS

CROSS-REFERENCE TO RELATED APPLICATIONS

This application is the national stage of International (PCT) Patent Application Ser. No. PCT/US2010/054738, filed Oct. 29, 2010, which claims the benefit of and priority to U.S. Provisional Patent Application Ser. No. 61/256,757, filed Oct. 29, 2009, the disclosures of which are hereby incorporated herein by reference in their entireties.

FIELD OF THE TECHNOLOGY

One or more aspects relate generally to osmotic separation. More particularly, one or more aspects involve use of engineered osmosis processes, such as forward osmosis (FO), to separate solutes from aqueous solutions.

BACKGROUND

Forward osmosis has been used for desalination. In general, a forward osmosis desalination process involves a container having two chambers separated by a semi-permeable membrane. One chamber contains seawater. The other chamber contains a concentrated solution that generates a concentration gradient between the seawater and the concentrated solution. This gradient draws water from the seawater across the membrane, which selectively permits water to pass, but not salts, into the concentrated solution. Gradually, the water entering the concentrated solution dilutes the solution. The solutes are then removed from the dilute solution to generate potable water.

SUMMARY

Aspects relate generally to engineered osmosis systems and methods, including forward osmosis separation, direct osmotic concentration, pressure assisted forward osmosis and pressure retarded osmosis.

In accordance with one or more embodiments, a system for osmotic extraction of a solvent from a first solution may comprise a first chamber having an inlet fluidly connected to a source of the first solution, a second chamber having an inlet fluidly connected to a source of a concentrated draw solution comprising ammonia and carbon dioxide in a desired molar ratio of at least one to one, a semi-permeable membrane system separating the first chamber from the second chamber, a separation system fluidly connected downstream of the second chamber comprising a distillation column, the separation system configured to receive a dilute draw solution from the second chamber and to recover draw solutes and a solvent stream, a recycle system comprising an absorber configured to facilitate reintroduction of the draw solutes to the second chamber to maintain the desired molar ratio, and a source of low grade heat in thermal communication with the separation system.

In some embodiments, the system may further comprise a draw solution storage system in fluid communication with the source of the concentrated draw solution. The draw solution storage system may comprise at least one bladder. The draw solution storage system may be contained in a vessel that further comprises at least one of a first solution storage bladder and a dilute draw solution storage bladder. In at least one embodiment, the distillation column may be positioned below ground level. The semi-permeable membrane system may comprise a membrane module immersed in a tank. The tank may comprise a first concentration zone and a second concentration zone. The membrane module may comprise a plurality of flat sheet membranes. In some embodiments, the system may further comprise a gas scour system. The system may further comprise a pretreatment system, in fluid communication with the first solution, selected from the group consisting of an ion exchange, chemical softening, nanofiltration, anti-scalants and precipitation unit operation. In at least one embodiment, the system may further comprise a salt crystallizer in cooperation with the separation system. The system may further comprise at least one of a pH, ion probe, Fourier transform infrared spectroscopy, and flow rate meter probe.

In accordance with one or more embodiments, a forward osmosis separation process may comprise introducing a first solution on a first side of a semi-permeable membrane, introducing a concentrated draw solution comprising ammonia and carbon dioxide at a molar ratio of at least one to one on a second side of the semi-permeable membrane to maintain a desired osmotic concentration gradient across the semi-permeable membrane, promoting flow of at least a portion of the first solution across the semi-permeable membrane to form a second solution on the first side of the semi-permeable membrane and a dilute draw solution on the second side of the semi-permeable membrane, introducing at least a portion of the dilute draw solution to a separation operation to recover draw solutes and a solvent stream, reintroducing the draw solutes to the second side of the semi-permeable membrane to maintain the desired molar ratio of ammonia to carbon dioxide in the concentrated draw solution, collecting the solvent stream, and controlling biological fouling of the semi-permeable membrane.

In some embodiments, controlling biological fouling involves degassing the first solution. Controlling biological fouling may also involve adjusting an osmotic pressure in an environment of the semi-permeable membrane. In at least one embodiment, controlling biological fouling involves at least one of sulphite reduction, biological treatment, osmotic shock, aeration, product water flux and bisulfite addition.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
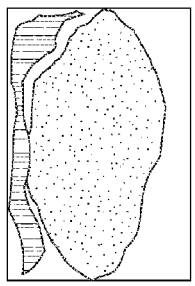
FIG. 1 is a schematic diagram of a solution storage system in accordance with one or more embodiments.
Figure 1:
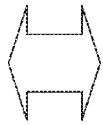
Figure 1:
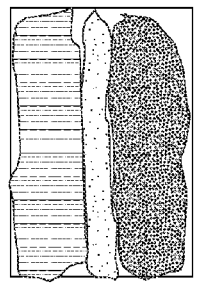
Figure 1:
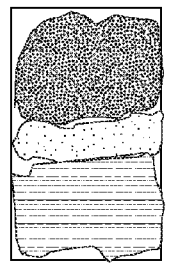
Figure 1:
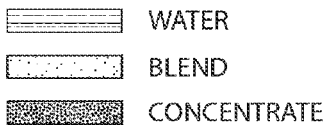
Figure 1:
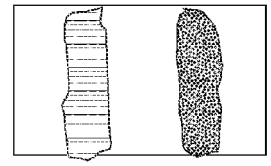

In accordance with one or more embodiments, an osmotic method for extracting water from an aqueous solution may generally involve exposing the aqueous solution to a first surface of a forward osmosis membrane. A second solution, or draw solution, with an increased concentration relative to that of the aqueous solution may be exposed to a second opposed surface of the forward osmosis membrane. Water may then be drawn from the aqueous solution through the forward osmosis membrane and into the second solution generating a water-enriched solution via forward osmosis, which utilizes fluid transfer properties involving movement from a less concentrated solution to a more concentrated solution. The water-enriched solution, also referred to as a dilute draw solution, may be collected at a first outlet and undergo a further separation process to produce purified water. A second product stream, i.e., a depleted or concentrated aqueous process solution, may be collected at a second outlet for discharge or further treatment.

Hydraulic pressure may generally promote transport of the first and second solutions through a membrane module along a longitudinal axis of their respective channels, while osmotic pressure may generally promote transport of water across a forward osmosis membrane in the module from the feed to the draw solution. Alternatively, hydraulic pressure may be exerted on the feed solution to assist the flow of water from the feed to draw solutions, or hydraulic pressure may be placed on the draw solution to allow the production of power from the expansion of the volume of the draw solution due to membrane flux of water from the feed solution driven by the osmotic pressure difference between the two solutions (PRO). Generally, flow channels within the module are designed to minimize the hydraulic pressure necessary to cause flow through these channels (cross-flow), but this is often at odds with the desire to create turbulence in the flow channels, beneficial for efficient generation of osmotic pressure difference between the two solutions, which has a tendency to increase resistance to flow. Higher osmotic pressure differences may generally increase transmembrane flux, but may also have a tendency to increase the amount of heat required to separate the draw solutes from the dilute draw solution for production of a dilute water product and a reconcentrated draw solution.

In accordance with one or more embodiments, a forward osmosis membrane module may include one or more forward osmosis membranes. The forward osmosis membranes may generally be semi-permeable, for example, allowing the passage of water, but excluding dissolved solutes therein, such as sodium chloride, ammonium carbonate, ammonium bicarbonate, and ammonium carbamate. Many types of semi-permeable membranes are suitable for this purpose provided that they are capable of allowing the passage of water (i.e., the solvent) while blocking the passage of the solutes and not reacting with the solutes in the solution. The membrane can have a variety of configurations including thin films, hollow fiber membranes, spiral wound membranes, monofilaments and disk tubes. There are numerous well-known, commercially available semi-permeable membranes that are characterized by having pores small enough to allow water to pass while screening out solute molecules such as sodium chloride and their ionic molecular species such as chloride. Such semi-permeable membranes can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$.

Preferably, the material selected for use as the semi-permeable membrane should generally be able to withstand various process conditions to which the membrane may be subjected. For example, it may be desirable that the membrane be able to withstand elevated temperatures, such as those associated with sterilization or other high temperature processes. In some embodiments, a forward osmosis membrane module may be operated at a temperature in the range of about 0-100 degrees Celsius. In some non-limiting embodiments, process temperatures may range from about 40-50 degrees Celsius Likewise, it may be desirable for the membrane to be able to maintain integrity under various pH conditions. For example, one or more solutions in the membrane environment, such as the draw solution, may be more or less acidic or basic. In some non-limiting embodiments, a forward osmosis membrane module may be operated at a pH level of between about 2 and 11. In certain non-limiting embodiments, the pH level may be about 7 to 10. The membranes used need not be made out of one of these materials and they can be composites of various materials. In at least one embodiment, the membrane may be an asymmetric membrane, such as with an active layer on a first surface, and a supporting layer on a second surface. In some embodiments, an active layer may generally be a rejecting layer. For example, a rejecting layer may block passage of salts in some non-limiting embodiments. In some embodiments, a supporting layer, such as a backing layer, may generally be inactive.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

A separation process in accordance with one or more embodiments may involve exposing a first solution to a first surface of a semi-permeable membrane. A second solution that has a concentration greater than that of the first solution may be exposed to a second opposed surface of this membrane. In some embodiments, the concentration of the second solution may be increased by using a first reagent to adjust the equilibrium of solutes within the second solution to increase the amount of a soluble species of solute within the second solution. The concentration gradient between the first and second solutions then draws the solvent from the first solution through the semi-permeable membrane and into the second solution producing a solvent-enriched solution. In accordance with one or more embodiments, a portion of the solutes may be recovered from the solvent-enriched second solution and recycled to the draw solution. The recovery process may yield a solvent product stream. The concentration gradient also produces a depleted solution on the first side of the semi-permeable membrane, which may be discharged or further processed. The depleted solution may include one or more target species of which concentration or recovery is desired.

In accordance with one or more embodiments, an apparatus for the extraction of a solvent from a first solution using osmosis is disclosed. In one non-limiting embodiment of the apparatus, the apparatus has a first chamber with an inlet and an outlet. The inlet of the first chamber may be connected to a source of the first solution. A semi-permeable membrane separates the first chamber from a second chamber. The second chamber has an inlet and first and second outlets. In some embodiments, a third chamber may receive a solvent-enriched second solution from the first outlet of the second chamber and a reagent from the second outlet of the second chamber. The third chamber may include an outlet that is connected to a separation operation, such as a filter for filtering the solvent-enriched second solution. The filter may have first and second outlets with the first outlet connected to the inlet of the second chamber in order to recycle a precipitated solute to the second chamber. In some embodiments, a fourth chamber may receive the solvent-enriched second solution from the second outlet of the separation operation. The fourth chamber may have a heater for heating the solvent-enriched second solution. A first outlet in the fourth chamber may return constituent gases to the inlet of the second chamber. As discussed herein, various species, such as the gases from the fourth chamber and/or precipitated solute from the third chamber, may be recycled within the system. Such species may be introduced, for example to the second chamber, at the same inlet or at different inlets. A second outlet in the fourth chamber may permit a final product, e.g., the solvent, to exit the apparatus. Flow channel configurations may account for changing flow volumes or flow rates in the feed solution and draw solution as flux occurs across the membrane from one solution to the other. The flow channels for the feed and draw solutions in the membrane systems should generally be designed to be approximately equal for short lengths and low to moderate flux rates, or tapering in which feed becomes narrower and draw becomes deeper for longer channel lengths and or higher fluxes.

In accordance with one or more embodiments, a forward osmosis membrane module may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, draw solutes may be recovered for reuse. A separation system may strip solutes from dilute draw solution to produce product water substantially free of the solutes. The separation system may include a distillation column. Draw solutes may then be returned, such as by a recycle system, back to the concentrated draw solution. Gaseous solutes may be condensed or absorbed to form a concentrated draw solution. An absorber may use dilute draw solution as an absorbent. In other embodiments, product water may be used as an absorbent, for all or a portion of the absorbing of the gas streams from a solute recycle system.

In accordance with one or more embodiments, the first solution may be any aqueous solution or solvent containing one or more solutes for which separation, purification or other treatment is desired. In some embodiments, the first solution may be non-potable water such as seawater, salt water, brackish water, gray water, and some industrial water. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver and zinc. In some examples, the first solution may be brine, such as salt water or seawater, wastewater or other contaminated water. The first solution may be delivered to a forward osmosis membrane treatment system from an upstream unit operation such as industrial facility, or any other source such as the ocean. The second solution may be a draw solution containing a higher concentration of solute relative to the first solution. A wide variety of draw solutions may be used. For example, the draw solution may comprise a thermolytic salt solution. In some embodiments, an ammonia and carbon dioxide draw solution may be used, such as those disclosed in U.S. Patent Application Publication Number 2005/0145568 to McGinnis which is hereby incorporated herein by reference in its entirety for all purposes. In one embodiment, the second solution may be a concentrated solution of ammonia and carbon dioxide. In at least one embodiment, the draw solution may comprise ammonia and carbon dioxide in a molar ratio of greater than 1 to 1.

Preferred solutes for the second (draw) solution may be ammonia and carbon dioxide gases and their products, ammonium carbonate, ammonium bicarbonate, and ammonium carbamate. Ammonia and carbon dioxide, when dissolved in water at a ratio of about 1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering the solution comprised primarily of ammonium bicarbonate with an excess of ammonia gas so that the ratio of ammonia to carbon dioxide increases to about 1.75 to 2.0 will shift the equilibrium of the solution towards the soluble species of the solute, ammonium carbamate. The ammonia gas is more soluble in water and is preferentially adsorbed by the solution. Because ammonium carbamate is more readily adsorbed by the solvent of the second solution, its concentration can be increased to the point where the solvent cannot adsorb anymore of the solute, i.e., saturation. In some non-limiting embodiments, the concentration of solutes within this second solution achieved by this manipulation is greater than about 2 molal, more than about 6 molal, or about 6 to 12 molal.

In accordance with one or more embodiments, the ratio of ammonia to carbon dioxide should substantially allow for the full absorption of the draw solution gases into the absorbing fluid, i.e., a portion of the dilute draw solution as described above, based on the highest concentration of the draw solution in the system. The concentration, volume, and flow rate of the draw solution should generally be matched to the concentration, volume and flow rate of the feed solution, such that the desired difference in osmotic pressure between the two solutions is maintained throughout the membrane system and range of feedwater recovery. This may be calculated in accordance with one or more embodiments taking into consideration both internal and external concentration polarization phenomena in the membrane and at its surface. In one non-limiting desalination embodiment, a concentrated draw solution inlet flow rate may be used which is approximately 33% of the saline feedwater flow rate, typically in the range of about 25% to 75% for a seawater desalination system. A lower salinity feed may require draw solution inlet rates of about 5% to 25% of the feedwater flow. The dilute draw solution outlet rate may typically be about 50% to 100% of the feedwater inlet rate, and about three to four times the volume of the brine discharge.

In accordance with one or more embodiments, the ratio of ammonia to carbon dioxide should generally be matched to the concentrations of the draw solution and the temperatures used in the draw solute removal and recovery process. If the ratios are not sufficiently high, it will not be possible to completely absorb the draw solute gases into salts for reuse in the concentrated solution, and if the ratio is too high, there will be an excess of ammonia in the draw solution that will not properly condense in a desired temperature range, such as that necessary for the use of waste heat to drive the process. For example, in some embodiments a distillation column may strip gases at about 50° C. and an absorbing column may operate at about 20° C. The ratio of ammonia to carbon dioxide should further be considered to prevent the passage of ammonia into the feed solution through the membrane. If the ratio is too high, this may cause unionized ammonia to be present in higher concentrations in the draw solution (normally primarily ammonium) than are necessary or desirable. Other parameters, such as feedwater type, desired osmotic pressure, desired flux, membrane type and draw solution concentration may impact the preferred draw solution molar ratio. The ratio of ammonia to carbon dioxide may be monitored and controlled in an osmotic separation process. In at least one embodiment, the draw solution may comprise ammonia and carbon dioxide in a molar ratio of greater than 1 to 1. In some non-limiting embodiments, the ratio for a draw solution at approximately 50 C, and with the molarity of the draw solution specified as the molarity of the carbon dioxide within that solution, may be at least about 1.1 to 1 for up to 1 molar draw solution, about 1.2 to 1 for up to 1.5 molar draw solution, about 1.3 to 1 for up to 3 molar draw solution, about 1.4 to 1 for up to 4 molar draw solution, about 1.5 to 1 for up to 4.5 molar draw solution, about 1.6 to 1 for up to 5 molar draw solution, about 1.7 to 1 for up to 5.5 molar draw solution, about 1.8 to 1 for up to 7 molar draw solution, about 2.0 to 1 for up to 8 molar draw solution and about 2.2 to 1 for up to 10 molar draw solution. Experiments indicate that these are approximately the minimum ratios needed for stable solubility of solutions of these concentrations at this approximate temperature. At lower temperatures, higher ratios of ammonia to carbon dioxide are required for the same concentrations. At higher temperatures, lower ratios may be required, but some pressurization of the solution may also be required to prevent decomposition of the solutes into gases. Ratios greater than 1 to 1, even at overall concentrations of less than 2 molar greatly increase the stability of the solutions and prevent evolution of carbon dioxide gas and in general thermolytic splitting of the draw solutions in response to even moderate amounts of heat and or reduction of pressure.

In accordance with one or more embodiments, a forward osmosis separation process may comprise introducing a first solution on a first side of a semi-permeable membrane, detecting at least one characteristic of the first solution, selecting a molar ratio for a concentrated draw solution comprising ammonia and carbon dioxide based on the at least one detected characteristic, introducing the concentrated draw solution comprising ammonia and carbon dioxide at the selected molar ratio on a second side of the semi-permeable membrane to maintain a desired osmotic concentration gradient across the semi-permeable membrane, promoting flow of at least a portion of the first solution across the semi-permeable membrane to form a second solution on the first side of the semi-permeable membrane and a dilute draw solution on the second side of the semi-permeable membrane, introducing at least a portion of the dilute draw solution to a separation operation to recover draw solutes and a solvent stream, reintroducing the draw solutes to the second side of the semi-permeable membrane to maintain the selected concentrations and molar ratio of ammonia to carbon dioxide in the concentrated draw solution, and collecting the solvent stream.

In accordance with one or more embodiments, an apparatus for osmotic extraction of a solvent from a first solution may comprise a first chamber having an inlet fluidly connected to a source of the first solution, a second chamber having an inlet fluidly connected to a source of a concentrated draw solution comprising ammonia and carbon dioxide in a molar ratio of at least 1 to 1, a semi-permeable membrane separating the first chamber from the second chamber, a separation system fluidly connected downstream of the second chamber comprising a distillation column, the separation system configured to receive a dilute draw solution from the second chamber and to recover draw solutes and a solvent stream, and a recycle system comprising an absorber configured to facilitate reintroducing the draw solutes to the second chamber to maintain the molar ratio of ammonia to carbon dioxide in the concentrated draw solution.

In accordance with one or more embodiments, systems and methods may be designed for a reduced footprint. In some embodiments, various solutions, such as concentrated and dilute reusable solutions, may be strategically stored in bladders. In at least one non-limiting embodiment, bladders may be made of neoprene or a similar material. In some non-limiting embodiments, three bladders may be used within the same vessel to store feed water, product water, concentrate, and dilute salt solution. The total volume within the vessel may remain the same regardless of whether the water and concentrate are separated or mixed. One bladder for each fluid, or two bladders, one for each of two fluids with the third fluid stored between the outside of the two bladders and the vessel wall, may be implemented. Bladders may be stored either in a vertical or horizontal alignment. FIG. 1 illustrates various two and three bladder configurations.

In other embodiments associated with a reduced footprint, a single enclosure, such as a concrete lined tank filled with packing used as distillation tower may be implemented. Steel caps may allow for formation of vacuum. Concrete may be coated with polymer or a pit lined with polymer may be used with no concrete. Buried vessels may also be used. Auxiliaries may be implemented. Low cost structures may facilitate heat exchange. In various embodiments, a common or shared wall construction may be used for integrating strippers and absorbers into the same structure to minimize footprint as well as cost and to generally improve aesthetics.

In accordance with one or more embodiments, desalination with forward osmosis may be accomplished with systems and methods involving a submerged atmospheric membrane design. A forward osmosis membrane device may be arranged in a hollow fiber configuration with draw solution within the lumens of the fiber and flowing at a velocity adequate to minimize concentration polarization on the draw solution side. To minimize concentration polarization on the feed side, the outside of the fibers may be scoured continuously or intermittently with air that is distributed across the support area of the module bundle. The fibers may be oriented in a vertical alignment parallel to air flow to minimize stress to the fibers. In another embodiment, spiral wound membranes configurations may also be used in submerged or flooded container configurations. These membrane modules may be subjected to fluid velocities sufficient to generate shear forces at the membrane surface useful for reducing concentration polarization phenomena and to keep the membrane surfaces clean. They may also be subjected to continuous or periodic scouring with air bubbles to reduce concentration polarization and to keep the membrane surfaces clean. These techniques may allow for the treatment of water with high fouling and/or scaling potentials.

Figure 2:
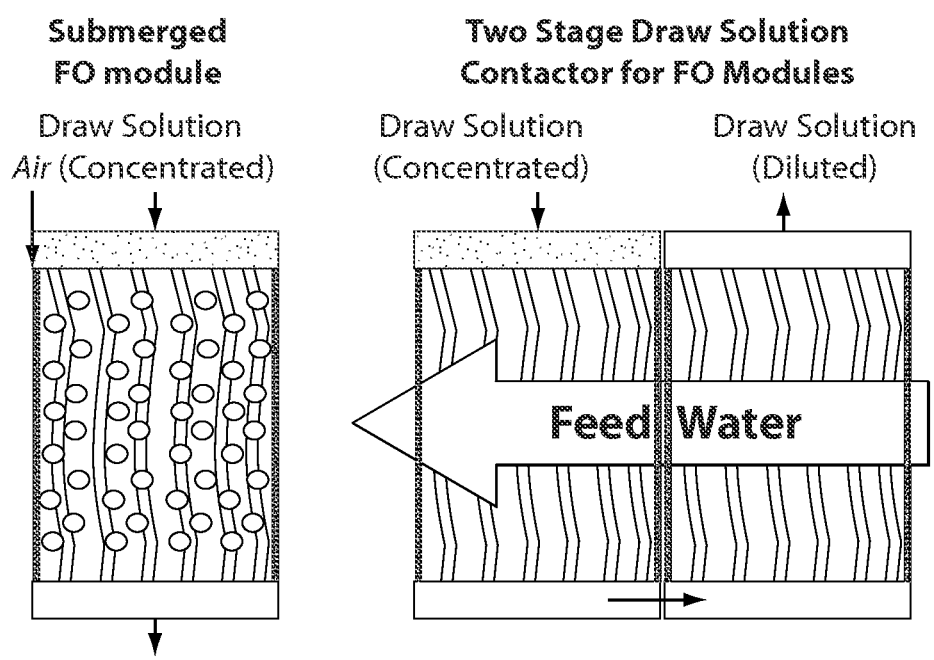
FIG. 2 is a schematic diagram of forward osmosis modules in accordance with one or more embodiments.

In operation as presented in the schematic of FIG. 2, concentrated draw solution may enter a distribution chamber at one end of the module, flow through the length of the fiber bundle and into a collection chamber at the other end of the module. The draw solution exiting a module may subsequently flow into the distribution of an adjacent module. This arrangement may allow the draw solution to flow in the opposite horizontal direction as the feedwater that is to be desalinated. A relatively constant osmotic driving force across the membrane may be beneficially obtained. Membrane system design may involve staging of the module contactors so that velocities past the surface of the membrane are kept relatively constant throughout the entire contactor basin on both the feed and draw solution sides.

Figure 3:
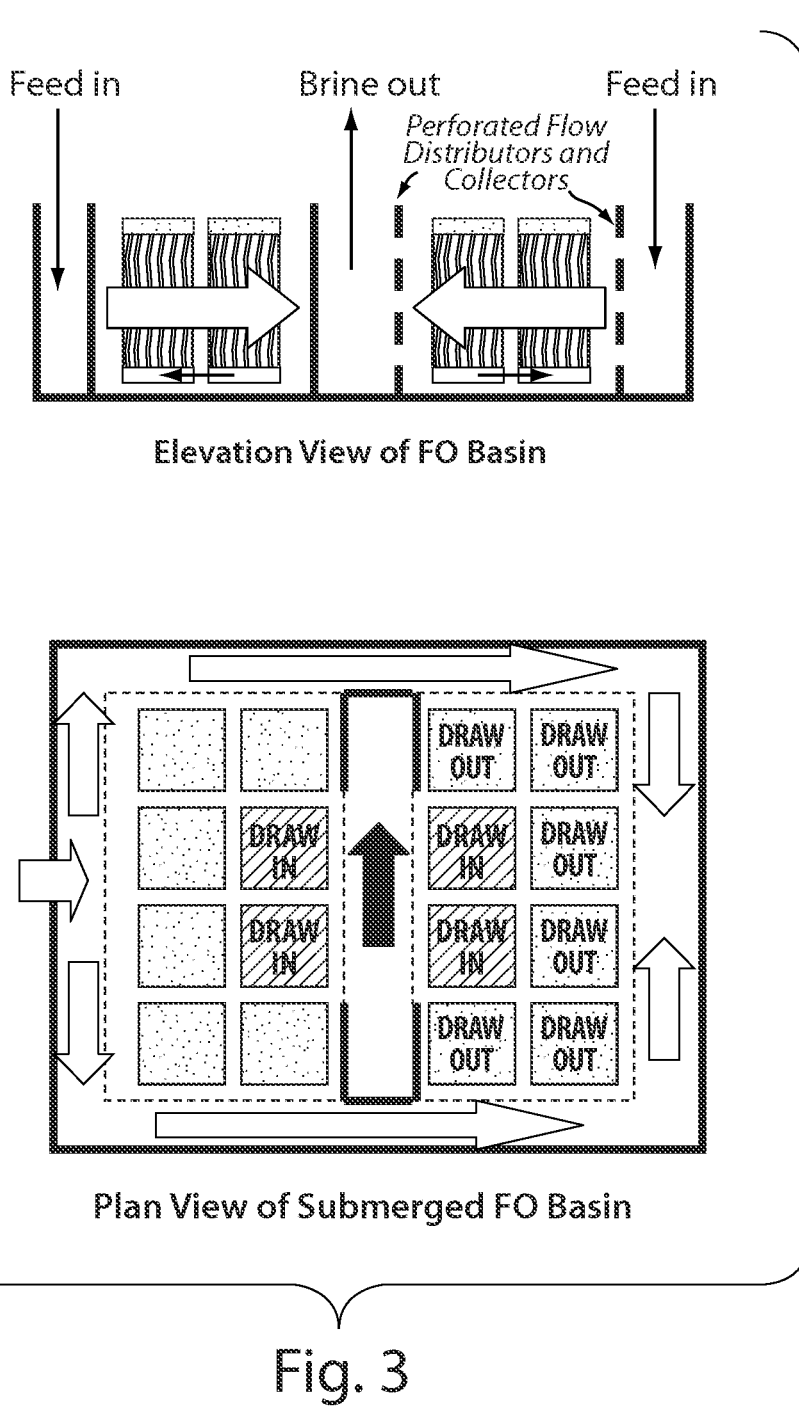
FIG. 3 is a schematic flow diagram of forward osmosis basins in accordance with one or more embodiments.

In accordance with one or more embodiments, FIG. 3 presents a schematic of a basin configuration in which raw feed water enters along the periphery. Flow enters and exits the basin through perforated plates to assure uniform vertical flow velocities. Fresh draw solution enters the top of the modules closest to the brine exit, flows down through the second stage and up through the first stage modules. The relative number of stages and modules per stage may be adjusted to meet specific conditions necessary for the feedwater and draw solution conditions.

Figure 4A:
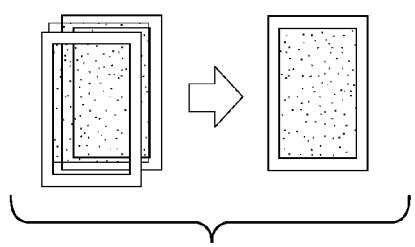
FIGS. 4A-4D are schematic diagrams of membrane frames in accordance with one or more embodiments.
Figure 4C:
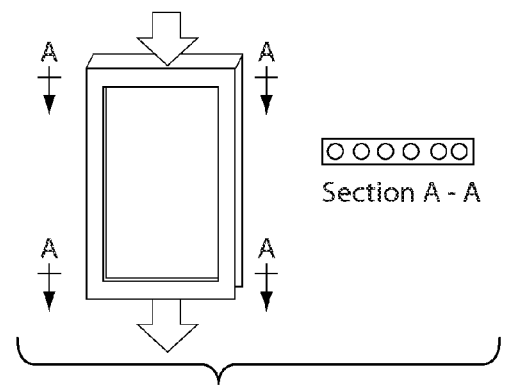
Figure 4B:
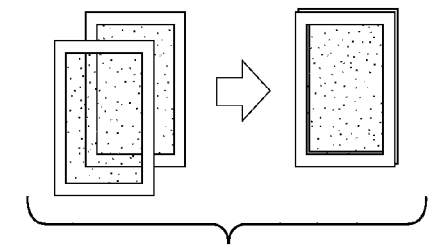

In accordance with one or more embodiments, systems and methods may involve a flat sheet forward osmosis membrane module design. A flat sheet membrane envelope may facilitate draw solution flow inside a membrane envelope. A membrane sheet may be glued between two plastic frames that provide structural support as illustrated in FIG. 4A. Two membrane frames may be combined into one membrane envelope as illustrated in FIG. 4B. The frames may be designed so that a row of orifices are created at opposite ends of the frame to facilitate uniform distribution and collection of draw solution within the envelope, as illustrated in FIG. 4C.

In at least some embodiments, the draw solution may increase substantially in volume as it flows through the envelope as a result of water transport across the membrane. With such a flow configuration, the velocity of the draw solution through the module may increase as the volume increases, which may lead to increased pressure drop and pumping energy. In accordance with one or more embodiments, a relatively constant draw solution velocity may be beneficially maintained as the volume increases from the inlet to outlet of the envelope.

Figure 4D:
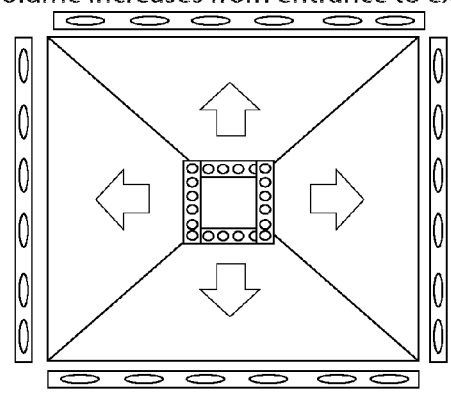

Alternatively, as illustrated in FIG. 4D, the module may be asymmetric with respect to its internal volume, for example, thicker at bottom for higher volume flow. Alternatively, the module may be flexible to a degree.

In accordance with one or more embodiments, membrane envelopes may be configured into a module consisting of multiple envelopes. Final spacing between envelopes and the dimensions of the module may be determined during product development. For example, in one non-limiting embodiment three envelopes per inch of module width may be used for estimating membrane area per unit volume.

Figure 5:
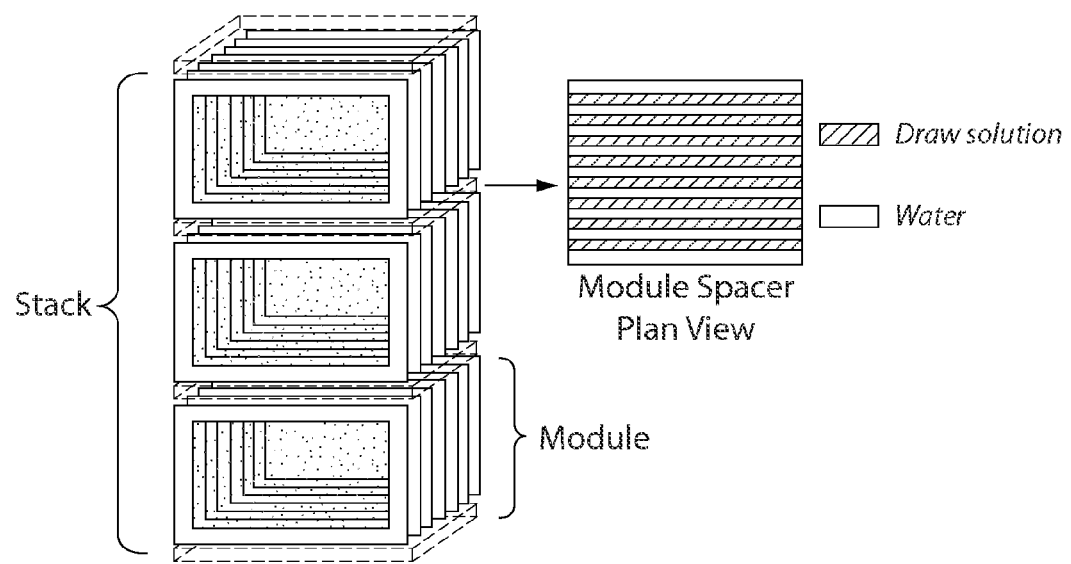
FIG. 5 is a schematic diagram of a module array in accordance with one or more embodiments.

With respect to FIG. 5, multiple modules may be arrayed vertically into a stack assembly, with a plastic support frame between each module designed to allow vertical flow of both water and draw solution. Overall individual module and stack dimensions may be determined based on factors including ease of handling during assembly and disassembly and/or removal from the membrane tank. Modules, spacers, and stacks may be designed to maintain feed and draw solution hydraulic characteristics.

Regarding the hydraulic profile through a membrane contactor in accordance with one or more embodiments, various design parameters may apply. Relatively constant velocity may be maintained on both sides of the membrane to minimize flux decline from low velocity and excess pressure drop from high velocity. Velocity may also remain suitably high to prevent solids deposition on the water side of the membrane. The volumetric flow rates of draw solution and water flowing through the process may respectively increase and decrease, making it desirable in some embodiments to use two or more stages in series both on the water and draw solution flows. In at least some embodiments, it may be preferable that the most concentrated draw solution (i.e., the draw solution entering the contactor) be used to extract water from the most saline water (brine exiting the contractor). In general, rotating equipment to move fluids through the process should be minimized. The design should provide features that facilitate reliable treatment of feed water sources with suspended solids and/or sparingly soluble salts that could precipitate following concentration.

Figure 6:
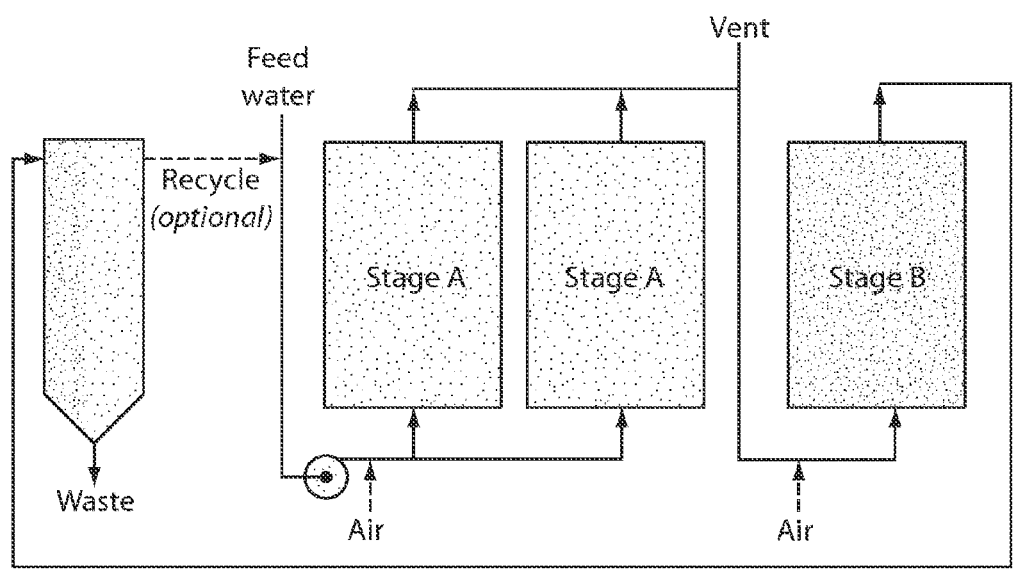
FIGS. 6 and 7 are schematic diagrams of hydraulic profiles in accordance with one or more embodiments.

In accordance with one or more embodiments as illustrated in FIG. 6, the hydraulic design for the water side of the concept may have one or more features such as two or more stages in series, one or more stacks in parallel per stage, aeration for control of crossflow velocity, surface scouring, motive force for recycling water via an air lift effect, once-through treatment or concentrate recycle, a feed pump if air alone is insufficient, and a concentrate settling tank for removal of and thickening of suspended solids from recycled concentrate.

Figure 7:
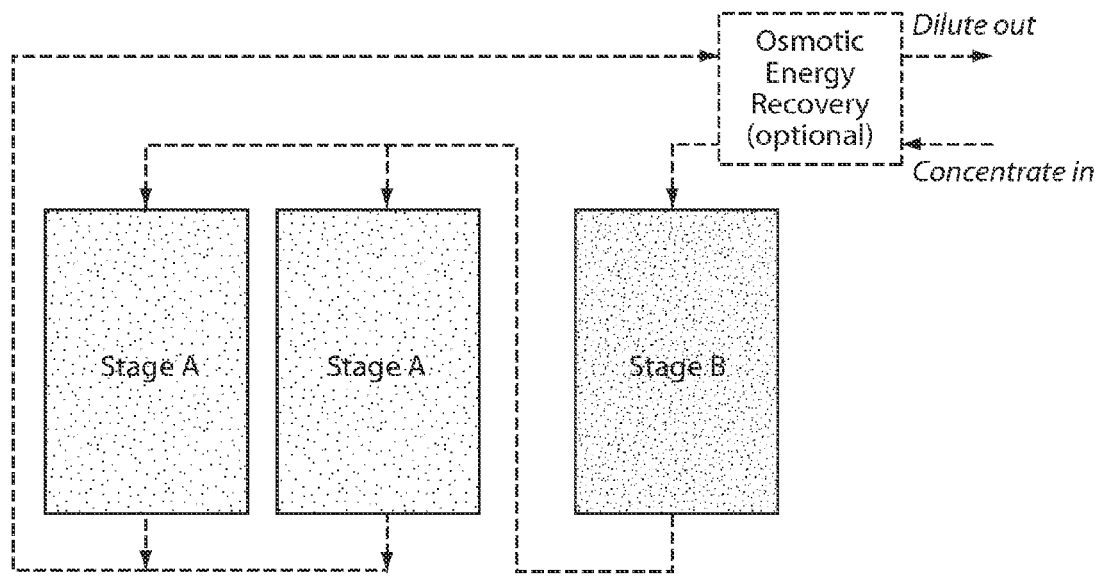

In accordance with one or more non-limiting embodiments, the hydraulic design for the draw solution side may optionally involve flow of draw solution in opposite direction as water and/or use of pressure developed in dilute concentrate as source of energy to pump concentrate through the system, as illustrated in FIG. 7.

Figure 8:
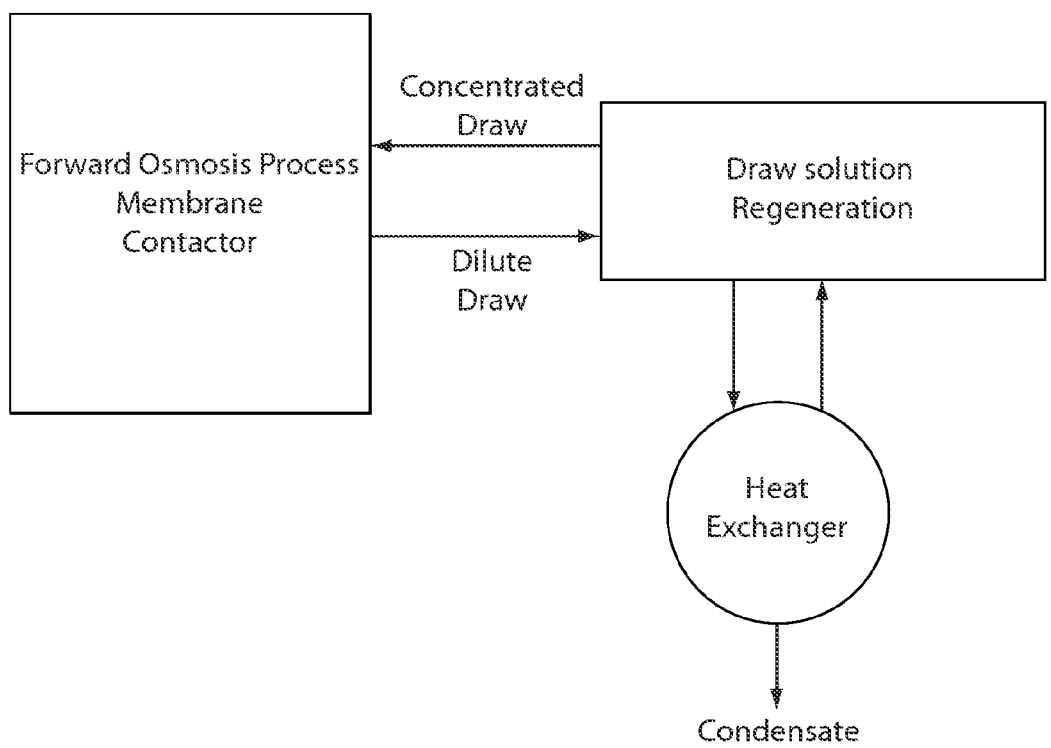
FIG. 8 is a schematic diagram of system integration in accordance with one or more embodiments.

In accordance with one or more embodiments, various engineered osmosis systems and methods may be integrated with larger systems. In some embodiments, systems and methods may be integrated with various heat sources and water systems as presented in FIG. 8. In at least one embodiment, a draw solution may be fed on the inside of tubes associated with a condenser. In some embodiments, hot water from below-ground may be used in a reboiler. In other embodiments, geothermal heat, waste heat from industrial sources, solar collectors, molten salt, or residual heat in a thermal storage system may be used. In still other embodiments, diesel generators may be implemented.

Figure 9:
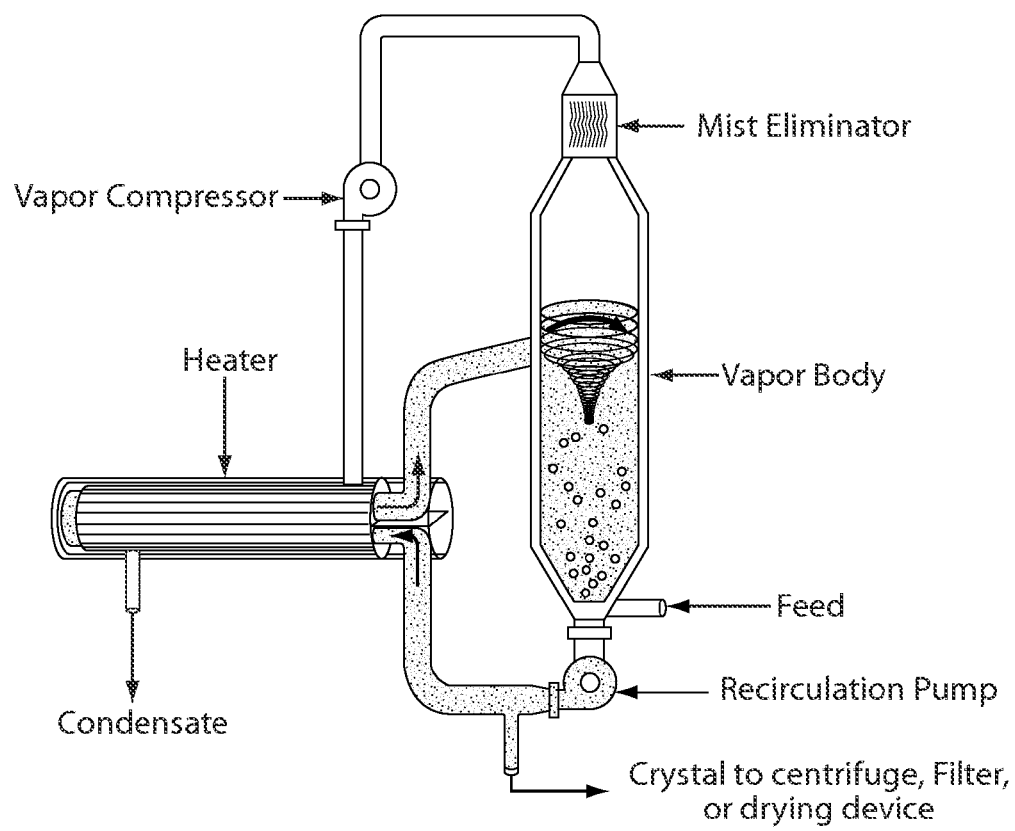
FIG. 9 is a schematic diagram of integration of a crystallizer in accordance with one or more embodiments.

In accordance with one or more embodiments, forward osmosis systems and methods may be integrated with a salt crystallizer. Heat management may be optimized for an integrated forward osmosis and crystallizer system such that the crystallizer produces a steam quality that may be subsequently used in the forward osmosis process for draw solution regeneration. The steam from the crystallizer may be either steam exiting the vapor body of the crystallizer after salt crystal separation, or alternatively a portion of the output from a vapor compressor that is used as the heat energy source for the crystallizer. FIG. 9 presents a schematic of one non-limiting embodiment of such integration.

Figure 10:
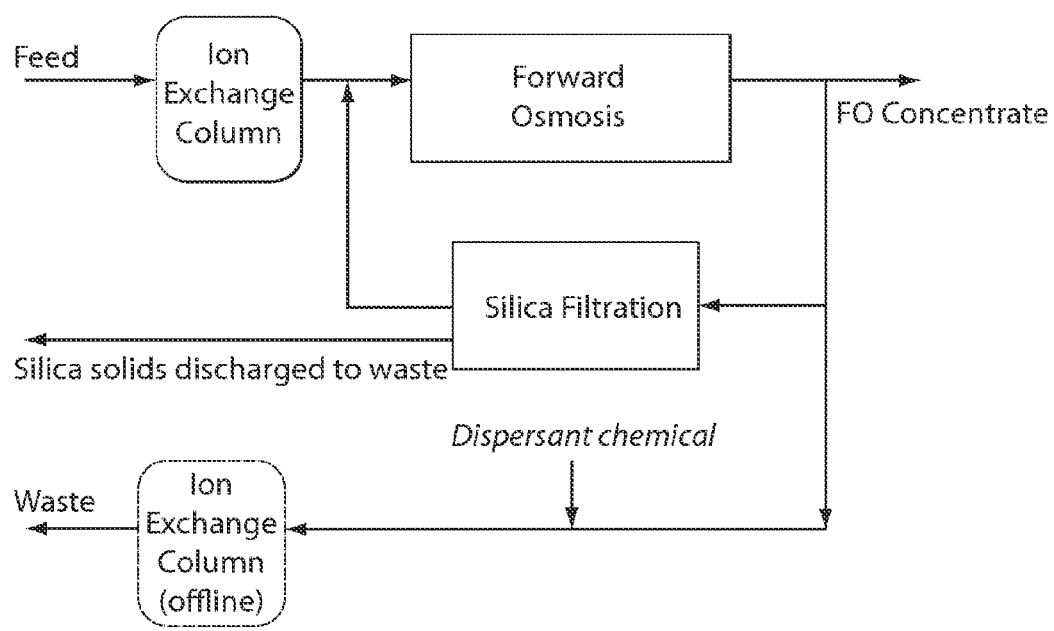
FIG. 10 is a schematic diagram of silica filtration integration in accordance with one or more embodiments.

In accordance with one or more embodiments, forward osmosis systems and methods may be integrated with auxiliary processes for maximizing water recovery from wastewater sources with potential for scale precipitation. To prevent precipitation of calcium and magnesium salts, calcium and magnesium may first be removed from the feed via techniques such as those involving ion exchange with sodium on strong acid cation exchange resin. The FO concentrate may be used for regenerating the resin. A chemical dispersant may be used to prevent precipitation within the ion exchange column. For silica scale control, a silica scale dispersant may be fed to the feed of the system. If the desired concentration factor leads to a concentration of silica that exceeds the maximum recommended by the dispersant supplier, a portion of the feed may be recycled through a small external microfilter or ultrafilter that removes silica. FIG. 10 presents a schematic of a non-limiting embodiment of the process.

In another embodiment, soluble salts may be concentrated in the FO membrane system to or beyond their solubility, with our without the use of anti-scalant chemicals, such that the concentrated feed solution is directed to a precipitation tank containing seed crystals and/or flocculant chemical addition. This solution may then be directed to a settling tank and/or to a filtration device to remove particulates. The effluent from this treatment may then be directed to another process, disposed of, or recirculated in the FO membrane system for further concentration. The use of fluid shear forces and/or the introduction of air bubbles for scouring may be used in the FO membrane system to ensure that precipitation and/or fouling does not occur on the membrane surface.

In accordance with one or more embodiments, systems and methods may be used in membrane bioreactor (MBR) operations for wastewater treatment. In some embodiments, wastewater may be converted for reuse from waste in a single step. Some embodiments may not require aeration such that direct membrane separation of water from suspended solids and organics in a waste stream, or a membrane digester operation, may provide savings in terms of energy and overall cost. In non-limiting embodiments, an MBR system may be designed such that circulation is along the surface of the membrane sheets, with a relatively unmixed region in the tank below the sheets. Solids may be removed from this settling zone. Fermentation may take place in the unmixed region as well, allowing for the removal and use of methane from the top of the tank. The tank may be configured such that pump outlets are placed on one side of the tank directing flow along the transverse (width) axis of the membrane sheets inducing shear force and turbulence if desired such that flow is evenly distributed along the longitudinal axis of the sheets, evenly distributed from top to bottom. The tank may further be configured so that the opposite wall of the tank is curved in such a way as to return water with reduced resistance back to the pump side of the tank, with this flow passing on either side of the membrane stack. Draw solution in the interior of the membrane pockets may flow from top to bottom, bottom to top, or alternate in series as needed. Membrane stacks may be arranged such that different regions of the tank experience different steady state concentrations of feed solution. Air bubbles may be used to scour the membrane surface to reduce concentration polarization phenomena and to prevent fouling and/or scaling on the membrane surface, with this air introduction being intended for these purposes rather than for the introduction of oxygen to the solution, as would be typical of conventional membrane bioreactors.

Figure 11:
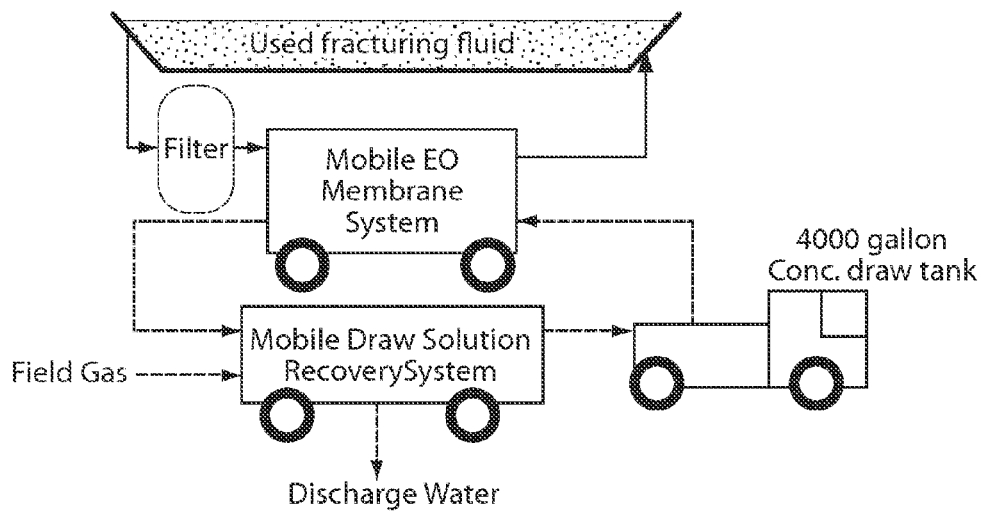
FIG. 11 is a schematic diagram of a mobile engineered osmosis process in accordance with one or more embodiments.

In accordance with one or more embodiments, systems and methods may be implemented in a batch engineered osmosis (EO) process. In some non-limiting embodiments, batches of brackish water and wastewater sources may be desalted and concentrated. Fluid to be treated may recirculate between a batch EO process and a storage tank for a water source until a desired salt concentration is achieved. The batch EO process may be designed to operate with suspended solids in the feedwater, either by pre-filtration or with a FO membrane and module design that can accommodate suspended solids. The process may be used either for mobile temporary treatment or permanent installations. FIG. 11 presents an example of how a mobile EO process may be applied to concentrate impounded brackish produced water.

A membrane module in accordance with one or more embodiments may be used in pressure retarded osmosis. Pressure retarded osmosis may generally relate to deriving osmotic power or salinity gradient energy from a salt concentration difference between two solutions, such as a concentrated draw solution and a dilute working fluid. In some examples, seawater may be a first solution and fresh water or nearly deionized water may be a second solution. In some embodiments, one or more spirally wound forward osmosis membrane modules may be enclosed in a pressure vessel to facilitate pressure retarded osmosis. One or more design aspects of the forward osmosis membrane module may be modified for pressure retarded osmotic use. Within pressure retarded osmosis, a draw solution may be introduced into a pressure chamber on a first side of a membrane. In some embodiments, at least a portion of the draw solution may be pressurized based on an osmotic pressure difference between the draw solution and a dilute working fluid. The dilute working fluid may be introduced on a second side of the membrane. The dilute working fluid may generally move across the membrane via osmosis, thus increasing the volume on the pressurized draw solution side of the membrane. As the pressure is compensated, a turbine may be spun to generate electricity. A resulting dilute draw solution may then be processed, such as separated, for reuse. In some embodiments, a lower-temperature heat source, such as industrial waste heat may be used in or facilitate a pressure retarded osmosis system or process.

Figure 12:
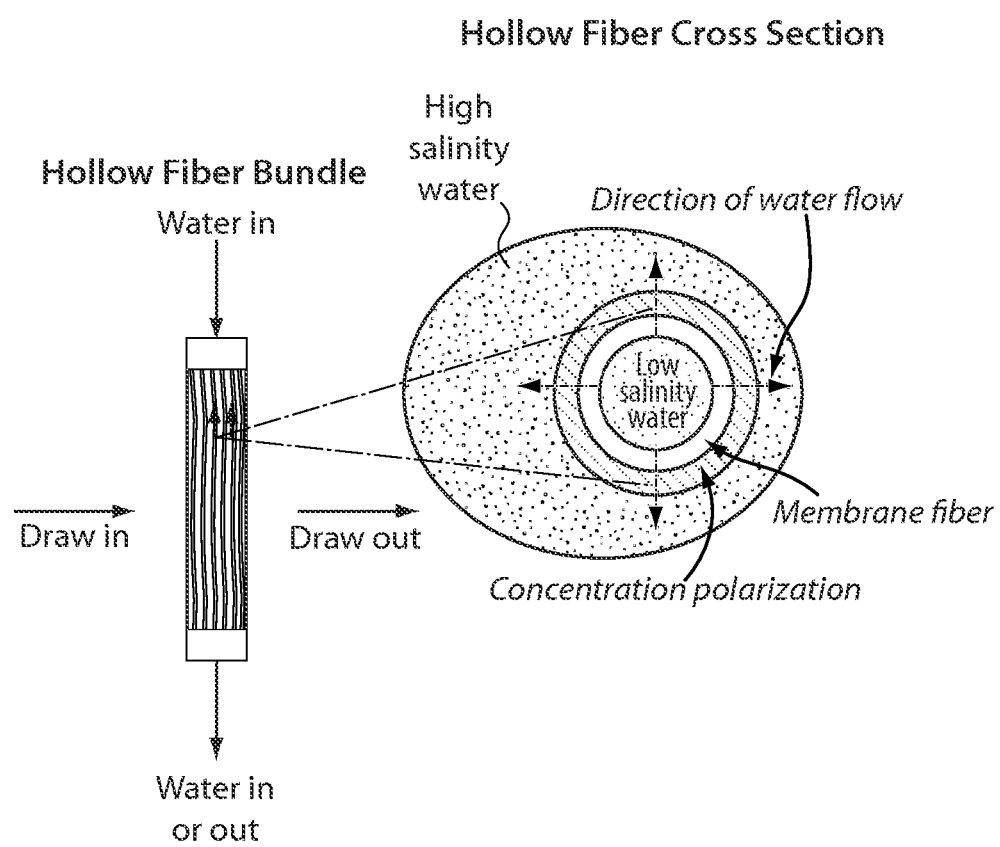
FIGS. 12 and 13 are schematic diagrams of pressure retarded osmosis contactors in accordance with one or more embodiments.
Figure 13:
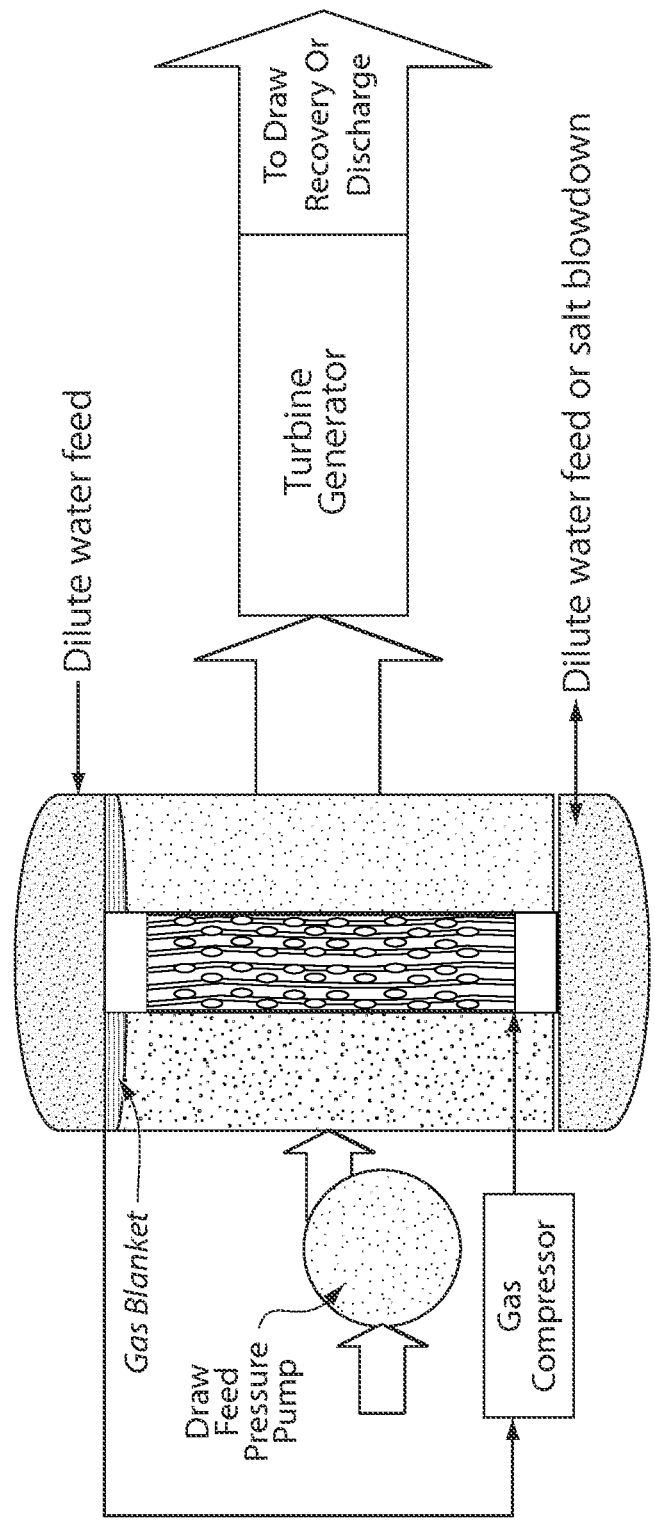

In accordance with one or more embodiments, systems and methods may be used in a large scale pressure retarded osmosis contactor. Hollow fiber membrane modules as illustrated in FIGS. 12 and 13 may be used. The modules may be installed within a vertical or horizontal pressure vessel, shown with a single module in a vertical pressure vessel for illustration purposes. In the case of "open" PRO that utilizes the osmotic pressure differential between seawater and fresh water, salt concentration may be controlled and adequate velocity to minimize the effects of concentration polarization on the fresh water side of the membrane may be maintained. Either the fresh water could enter one end of the fiber and exit the other end, or alternatively fresh water could enter both ends of the fiber and allow salts to accumulate to some degree within the fiber, followed by periodic flushing of the salts in the lumen with fresh water introduced at the top. For "closed loop" PRO where both the reconstituted draw solution and distilled or deionized water are returned to the contactor, water can be fed to the module from both the top and bottom of the fiber bundle simultaneously to minimize hydraulic pressure loss within the fibers and maximize energy production.

In either open or closed loop PRO, control of concentration polarization on the outside of the fibers within the high pressure zone may facilitate maximizing water flux rate and energy production. A gas may be introduced at the bottom of each module to disrupt the CP boundary layer. The gas may be collected at the top of the high pressure compartment and recycled with a small compressor. The compressor only needs to overcome the relatively low pressure loss across the recycle piping and distribution system within the contactor, minimizing energy consumption.

In some embodiments involving open PRO, the gas may be air but could also be or include another gas such as nitrogen or carbon dioxide for pH control to prevent calcium carbonate precipitation in the modules. In the case of closed PRO using ammonium carbonate as the draw solution, it may be advantageous to use ammonia and/or carbon dioxide exiting the distillation column in the thermal recovery system as the disruption gas, in which case the membrane contactor vessel would also serve as a gas absorber and thus provide some savings in capital cost and complexity for the overall process. Gases that do not go into solution are recycled in various embodiments, such that it is feasible to use a mixture of gases, particularly if one or more of the gases is significantly dissolved within the draw solution. For example, air and ammonia and carbon dioxide may be used in an appropriate ratio and gas volumes that assure adequate fiber agitation.

In accordance with one or more embodiments, membrane fouling may be monitored and controlled. Membrane fouling may be controlled using scouring techniques such as those involving liquid turbulence and gas introduction. In some embodiments, shear forces, such as those involving fluid dynamics in circulation inducing shear at a membrane surface, may be used for scouring. In other embodiments, objects such as foam balls may be placed in flow paths to effect scouring. In some embodiments, fouling and biological activity may be controlled through manipulation of operational parameters to alter osmotic pressure and flow paths, for example, such that different membrane areas experience different solutions, osmotic pressures, pH, or other conditions at different times. Variations over time, such as based on minutes, hours or years, may be scheduled.

In accordance with one or more embodiments, the presence of extremophiles in a draw solution may be controlled with various techniques. The feed may be degassed or otherwise pretreated to prevent nitrifying bacteria or other organisms from consuming draw solution constituents by reaction with a gas in the feed stream, such as oxygen. Membrane contactors or other degassing techniques may be used. Sulphite reduction, biological treatment, osmotic shocks, conventional cleaning techniques that do not react with draw solution, product water flux without chemicals, brine solution aeration, and bisulfite addition are other techniques that may be implemented to control extremophiles in draw solution.

In accordance with one or more embodiments, devices, systems and methods may generally involve a controller for adjusting or regulating at least one operating parameter of the device or a component of the system, such as, but not limited to, actuating valves and pumps, as well as adjusting a property or characteristic of one or more fluid flow streams through the spirally wound forward osmosis membrane module. A controller may be in electronic communication with at least one sensor configured to detect at least one operational parameter of the system, such as a concentration, flow rate, pH level or temperature. The controller may be generally configured to generate a control signal to adjust one or more operational parameters in response to a signal generated by a sensor. For example, the controller can be configured to receive a representation of a condition, property, or state of any stream, component or subsystem of a forward osmosis separation device. The controller typically includes an algorithm that facilitates generation of at least one output signal, which is typically based on one or more of any of the representation(s) and a target or desired value such as a set point. In accordance with one or more particular aspects, the controller can be configured to receive a representation of any measured property of any stream, and generate a control, drive or output signal to any of the system components, to reduce any deviation of the measured property from a target value.

In accordance with one or more embodiments, process control systems and methods may monitor various concentration levels, such as may be based on detected parameters including pH and conductivity. Process stream flow rates and tank levels may also be controlled. Temperature and pressure may be monitored. Membrane leaks may be detected using ion selective probes, pH meters, tank levels and stream flow rates. Leaks may also be detected by pressurizing a draw solution side of a membrane with gas and using ultrasonic detectors and/or visual observation of leaks at a feedwater side. Other operational parameters and maintenance issues may be monitored. Various process efficiencies may be monitored, such as by measuring product water flow rate and quality, heat flow and electrical energy consumption. Cleaning protocols for biological fouling mitigation may be controlled such as by measuring flux decline as determined by flow rates of feed and draw solutions at specific points in a membrane system. A sensor on a brine stream may indicate when treatment is needed, such as with distillation, ion exchange, breakpoint chlorination or like protocols. This may be done with pH, ion selective probes, Fourier Transform Infrared Spectrometry (FTIR) or other means of sensing draw solute concentrations. A draw solution condition may be monitored and tracked for makeup addition and/or replacement of solutes Likewise, product water quality may be monitored by conventional means or with a probe such as an ammonium or ammonia probe. FTIR may be implemented to detect species present providing information which may be useful, for example, to ensure proper plant operation, and for identifying behavior such as membrane ion exchange effects.

In accordance with one or more embodiments, either or both concentrated and dilute draw solution may be stored in bladders, in some cases within a vessel. Similarly, product water and/or feed water may be stored in bladders. When a vessel is used with multiple bladders, the total volume of the vessel need not change as the volumes of the various containers change with flux through the membrane and recycling of draw solution, such that the footprint of the process may be minimized. Distillation columns may be placed within the ground by use of, for example, a coated concrete lined pit filled with packing and affixed with a cap. Membrane modules may be immersed in a feed water tank, with draw solution on the interior of the membrane. Membranes may be spiral, hollow fiber, plate and frame, or other configuration. Air scour in forward osmosis membrane applications may keep feed channels clean. Air scour may be continuous or intermittent. Membrane modules may be arranged within an immersed tank such that different zones have different concentrations. Flat sheet forward osmosis membranes may be used in a stack configuration and immersed in tank. Low temperature heat may be used for regeneration of draw solution in forward osmosis or pressure retarded osmosis. Sources of low grade heat may include geothermal, solar thermal, residual heat from thermal storage systems, waste heat from industrial and/or power producing processes. A forward osmosis process may be integrated with a salt crystallizer, such that heat from the crystallizer may be used in the forward osmosis process, and any draw solutes which have flowed to the forward osmosis brine may be returned to the forward osmosis process as gases from the crystallizer. Forward osmosis may be paired with scale prevention pretreatments to allow high feedwater recovery including, for example, ion exchange, chemical softening, nano filtration, anti-scalants, and/or precipitation techniques. Air scouring in a scaling prevention system for FO may be used to prevent scaling on a membrane surface. Forward osmosis may be used for organic containing waters without aeration for biological activity. A waste stream may be concentrated for potential use in a digester, while potentially producing methane within the membrane tank for energy use, and producing a product water of reuse quality. This may be particularly effective in an immersed membrane tank design. In addition to providing oxygen, air scouring may also be used to permit a high concentration of organics without membrane fouling. A batch or continuous stir tank reactor (CSTR) type operation may be implemented with forward osmosis, particularly to allow for enhanced function of organics concentrating forward osmosis and/or precipitating systems. Pressure retarded osmosis systems may also be in an immersed tank configuration. Pressure retarded osmosis systems may be aerated to prevent fouling and/or scaling and to reduce concentration polarization. Reactive gases may also assist in this functionality. Biological growth in forward osmosis systems may be controlled by alternating which membrane modules or sections of an array are exposed to high or low osmotic pressures. For example, a membrane array section which normally sees 0.5 M waters may be changed to the treatment of 2 M waters. Such adjustment will make biofilm growth very difficult. Degassing of the feed stream may also be performed to prevent growth of certain types of biological organisms. For example, removing oxygen may restrict growth of nitrifying organisms that might oxidize ammonia passing from draw solution to feed solution. Sulphite reduction, biological treatment, osmotic shocks, conventional cleaning techniques which do not react with draw solution, product water flux without chemicals, brine solution aeration, and bisulfite addition are other techniques which may be implemented to restrict biological activity. In some embodiments, pH, ion probe, FTIR, and/or flow rates may be used to control forward osmosis systems to ensure desired fluxes, osmotic pressure differences, ratios of ammonia to carbon dioxide, and concentrations.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced other than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An apparatus for osmotic extraction of a solvent from a first solution, comprising:
    a first chamber having an inlet fluidly connected to a source of the first solution;
    a second chamber having an inlet fluidly connected to a source of a concentrated draw solution comprising ammonia and carbon dioxide in a desired molar ratio of greater than one to one and having a concentration greater than the first solution;
    a semi-permeable membrane system separating the first chamber from the second chamber and configured to promote the flow of at least a portion of the solvent from the first solution to the concentrated draw solution to form a depleted first solution in the first chamber and a dilute draw solution in the second chamber;
    a separation system fluidly connected downstream of the second chamber, the separation system configured to receive a first portion of the dilute draw solution from the second chamber and to separate ammonia and carbon dioxide draw solutes from a solvent stream;
    a recycle system comprising a condenser to condense the ammonia and carbon dioxide draw solutes, and further comprising an absorber in fluid communication with the condenser and the second chamber for receiving the condensed draw solutes and a second portion of the dilute draw solution as an absorbent and outputting a re-concentrated draw solution to maintain the desired molar ratio in the second chamber; and
    a source of low grade heat in thermal communication with the separation system.

2. The apparatus of claim 1, wherein the semi-permeable membrane system comprises a membrane module immersed in a tank.

3. The apparatus of claim 2, wherein the tank comprises a first concentration zone and a second concentration zone.

4. The apparatus of claim 2, wherein the membrane module comprises a plurality of flat sheet membranes.

5. The apparatus of claim 1, further comprising a gas scour system.

6. The apparatus of claim 1, further comprising a pretreatment system in fluid communication with the first solution, wherein the pretreatment system comprises at least one of ion exchange, chemical softening, nanofiltration, anti-scalants, or a precipitation unit operation.

7. The apparatus of claim 1, further comprising a salt crystallizer in cooperation with the separation system.

8. The apparatus of claim 1, further comprising at least one of a pH probe, an ion selective probe, Fourier transform infrared spectroscopy, or a flow rate probe for monitoring at least one of the first solution, the concentrated draw solution, the dilute draw solution, or the solvent stream.

9. The apparatus of claim 1, wherein the separation system comprises a distillation column.

10. The apparatus of claim 9, wherein the distillation column is positioned below ground level.

* * * * *

UNITED STATES PATENT AND TRADEMARK OFFICE
CERTIFICATE OF CORRECTION

| | |
|---|---|
| PATENT NO. | : 9,266,065 B2 |
| APPLICATION NO. | : 13/504049 |
| DATED | : February 23, 2016 |
| INVENTOR(S) | : Robert L. McGinnis et al. |

It is certified that error appears in the above-identified patent and that said Letters Patent is hereby corrected as shown below:

In the Specification section "Cross-Reference to Related Applications" at col. 1, line 11:

Delete "filed October 29, 2009," and insert --filed October 30, 2009,--

Signed and Sealed this
Third Day of May, 2016

Michelle K. Lee
*Director of the United States Patent and Trademark Office*